US009671971B2

(12) United States Patent
Trika et al.

(10) Patent No.: US 9,671,971 B2
(45) Date of Patent: Jun. 6, 2017

(54) MANAGING PRIOR VERSIONS OF DATA FOR LOGICAL ADDRESSES IN A STORAGE DEVICE

(71) Applicant: INTEL CORPORATION, Santa Clara, CA (US)

(72) Inventors: Sanjeev N. Trika, Portland, OR (US); Benjamin W. Boyer, Hillsboro, OR (US); Ravi L. Sahita, Beaverton, OR (US); Xiaoning Li, Santa Clara, CA (US); Faraz A. Siddiqi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 30 days.

(21) Appl. No.: 14/672,020

(22) Filed: Mar. 27, 2015

(65) Prior Publication Data

US 2016/0283160 A1 Sep. 29, 2016

(51) Int. Cl.
*G06F 12/12* (2016.01)
*G06F 3/06* (2006.01)
*G06F 12/14* (2006.01)

(52) U.S. Cl.
CPC .......... *G06F 3/0638* (2013.01); *G06F 3/0604* (2013.01); *G06F 3/0632* (2013.01); *G06F 3/0673* (2013.01); *G06F 12/1466* (2013.01)

(58) Field of Classification Search
CPC ... G06F 3/0638; G06F 12/1466; G06F 3/0673
USPC ........................................................ 711/202
See application file for complete search history.

(56) References Cited

U.S. PATENT DOCUMENTS

| 2006/0155946 | A1 | 7/2006 | Ji |
| 2011/0276827 | A1 | 11/2011 | Royer, Jr. et al. |
| 2012/0173794 | A1 | 7/2012 | Royer, Jr. et al. |
| 2013/0332660 | A1 | 12/2013 | Talagala et al. |
| 2014/0189275 | A1 | 7/2014 | Chiu et al. |

OTHER PUBLICATIONS

Intel Corporation, "Intel Solid-State Drive DC S3700 Series", Product Specification, Jan. 2015, 34 pp.
International Search Report and Written Opinion for International Application No. PCT/US2016/019961, dated Jul. 11, 2016, 10 pp. [77.316PCT (ISR & WO)].

*Primary Examiner* — Jae Yu
(74) *Attorney, Agent, or Firm* — Konrad Raynes Davda & Victor LLP; David W. Victor

(57) ABSTRACT

Provided are a method, system, and computer readable storage medium for managing access to a storage device. A logical-to-physical mapping indicates for each logical address a physical address in the storage device having current data for the logical address and version information indicating whether there is a prior version of data for the logical address. In response to the logical-to-physical mapping indicating that there is no prior version of the data for a target logical address of a write, including information on the target physical address and the physical address indicated in the logical-to-physical mapping in checkpoint information. The version information for the target logical address is updated to indicate that there is a prior version of data. Data for the write is written to a target physical address. The logical-to-physical mapping for the target logical address is updated to indicate the target physical address.

25 Claims, 11 Drawing Sheets

Checkpoint Information Entry

Logical-to-Physical Mapping

Checkpoint Information Entry

MANAGING PRIOR VERSIONS OF DATA FOR LOGICAL ADDRESSES IN A STORAGE DEVICE

TECHNICAL FIELD

Embodiments described herein generally relate to managing prior versions of data for logical addresses in a storage device.

BACKGROUND

Data in a storage device may be backed up at different points-in-time to allow restoration of data to a saved point-in-time as part of a process referred to as checkpointing. Operating system checkpointing involves the operating system storing prior versions of updated data to create restore points or checkpoints to allow the user to return the state of the data to that checkpoint. However, operating system checkpointing is susceptible to malware attacks that can attack the operating system and application files to corrupt the checkpoint data to prevent the user from restoring data to a point before the malware was installed. Further, operating system based checkpointing is susceptible to other software interference and anti-virus programs must be disabled for checkpointing to work properly.

Virtual Machine checkpointing involves the virtual machine monitoring for changes and storing prior versions of updated data to allow restoring the state of the virtual machine to a checkpoint time. Virtual machine checkpointing is also susceptible to malware attacks.

System backups comprise a backup of all the data in a drive as of a checkpoint time to another partition on the storage device or another storage device. System backups run on the host system and consume significant host resources, which may result in performance degradation at the host system. Further, host based system backups are often slow and require substantial time to backup and restore.

There is a need in the art to provide improved solutions for taking checkpoints of data written to a storage device.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
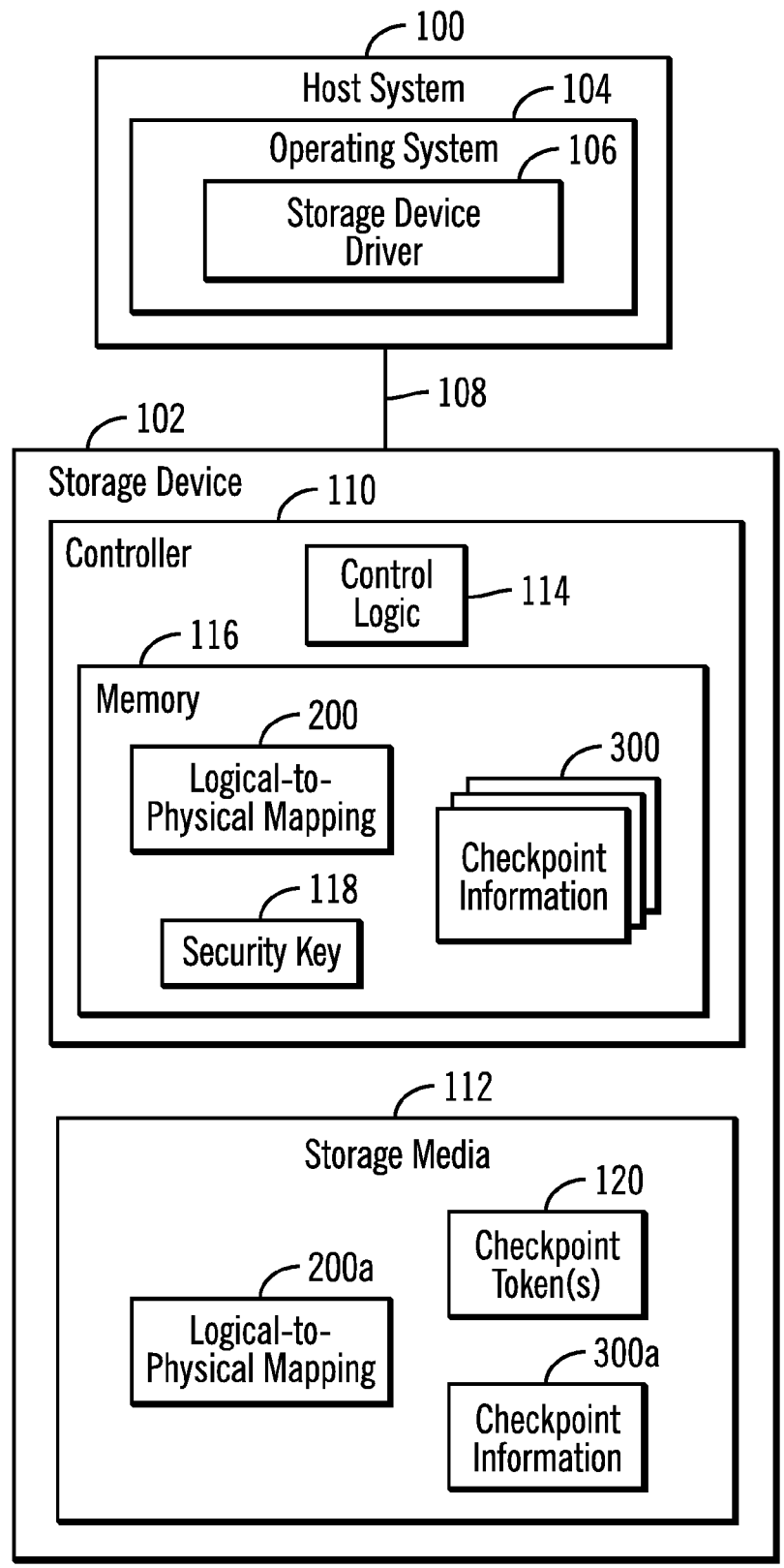
FIG. 1 illustrates an embodiment of a storage system in which a host system performs Input/Output (I/O) operations with respect to a storage device.

Prior art checkpointing and backup solutions may be susceptible to attacks from malware and may consume substantial host computational resources.

Described embodiments maintain prior versions of data in a storage device that writes new data or updates to new locations in the storage. A logical-to-physical mapping includes version information for each logical address indicating whether there is a prior version of the data for the logical address. For implementations having multiple checkpoints, the version information identifies the checkpoint for which the prior version of the data was established. Upon receiving a write, information on the logical and physical address for the logical address to update is written to checkpoint information for the current checkpoint. The write data is written to a new location in the storage device different from the physical address having the current version, where information on the physical address having the prior version of the data is maintained in the checkpoint information. During a restore operation, defragmentation operation, and differential operation, the physical address of the logical address having the prior version of the data may be used to restore data to the previous version, determining whether that physical address may be reclaimed, and to provide information on prior versions of data for logical addresses.

With described embodiments, implementing the checkpointing in the storage device and control logic of the storage device controller makes the restore procedure less susceptible to malware which operates usually at the application and operating system level. Further, encryption technologies may be used by the storage device control logic to authenticate checkpointing related communications from the host system to prevent malware from issuing storage device checkpointing commands to corrupt the checkpoint data in the storage device. Administrative access control may also be used to authenticate check pointing related communication from the host system to the drive.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a storage environment having a host system 100 which stores data, such as user data that may be communicated from other attached computer systems and devices, to a storage device 102. The host system 100 includes an operating system 104 including a storage device driver 106 to manage the storage of data in the storage device 102. A connection 108 provides a connection from the host 100 to the storage device 102.

The storage device 102 includes a controller 110 to perform storage device operations and respond to requests from the host 100 to access data in a storage media 112 of the storage device 102. The controller 110 includes control logic 114 having code and processing elements to perform the storage device 102 operations. The control logic 114 may have a memory 116 including a logical-to-physical mapping 200 mapping logical addresses used by the host system 100 to physical addresses in the storage media 112. The control logic 114 further maintains checkpoint information 300 having information on prior versions of data for logical addresses since a checkpoint was created, which comprises a point-in-time at which data being updated is saved for use in restore operations. In one embodiment, there may be only one instance of checkpoint information 300 if only one checkpoint is maintained in the storage device 102. If the control logic 114 implements multiple checkpoints, then an instance of checkpoint information 300 is maintained for each checkpoint providing the physical addresses having prior versions of data that has changed since a checkpoint.

In one embodiment, updates to a logical address are written to a new available physical address in the storage media 102 without overwriting the physical address having the previous version of the data for the logical address. In this way previous versions of the data for a logical address are maintained at the previous physical addresses to which the previous versions were written. In one embodiment, a log structured array may be used to determine new physical addresses to use for an update for a logical address.

The control logic 114 may further maintain a security key 118 that is used to authenticate the host system 100 before processing checkpoint commands. The key 118 may be part of any security technique, such as host authentication mechanism, e.g., a shared key, a passphrase or cookie, a public key used to decrypt messages from the host 102, etc. In one embodiment, the host system 100 may include a Trusted Platform Module (TPM) module, to generate a public/private key pair and send the public key to the storage device to use to decrypt communications from the host system 100 encrypted with the private key to authenticate the host.

The storage media 112 may store one or more checkpoint tokens 120, where a checkpoint token 120 is used to identify a created checkpoint, a copy of the logical-to-physical mapping 200a that is maintained in the controller 110 memory, and a copy of the checkpoint information 300a. The logical-to-physical mapping 200 and checkpoint information 300 in the controller 112 may be periodically stored in the storage media 112 as copies 200a, 300a.

The storage device 102 may comprise a hard disk drive, solid state drive (SSD), flash drive, etc. For SSD implementations, the storage media 112 may comprise NAND dies of flash memory cells, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory, energy source backed (battery/super-capacitor) DRAM, and other electrically erasable programmable read only memory (EEPROM) type devices. For hard disk drive implementations, the storage media 112 may comprise a magnetic disk drive.

The host 100 may communicate with the storage device 102 over an interface 108 such as a bus interface. The host 100 and storage device 102 may be located in a same enclosure or separate enclosures. Alternatively, the host system 100 may communicate with the storage device 102 over a network.

The host 100 and storage device 102 may include Input/Output (I/O) interfaces to allow communication therebetween, such as a Serial Advanced Technology Attachment (SATA) interface and include a SATA compliant bus coupling the host 100 and the storage device 102. In other embodiments, other types of I/O interfaces and bus interconnects may be used, such as Serial Attached Small Computer System Interface (SCSI) (or simply SAS), Peripheral Component Interconnect Express (PCIe), etc.

Figure 2:
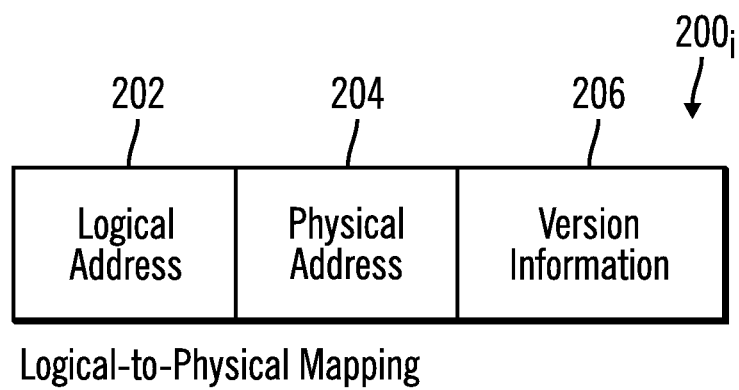
FIG. 2 illustrates an embodiment of a logical-to-physical mapping.

FIG. 2 illustrates an embodiment of an instance of a logical-to-physical mapping $200_i$ for one logical address 202, that identifies a physical address 204 in the storage media 112, such as a block address, at which the current/active data for the logical address 202 is stored, and version information 206 identifying a checkpoint when the data has changed since the last checkpoint. If the storage device 102 only has one checkpoint, then the version information 206 may indicate whether there is a prior version of the data. If there are multiple checkpoints, then the version information 206 indicates the checkpoint or point-in-time for the prior version of the data as of the time of the checkpoint. For instance, in a multi-checkpoint implementation, if the data for a logical address 202 is changed between checkpoints i and j, then the version information 206 for that logical address would indicate the checkpoint i, because the previous version of the data in the checkpoint information $300_i$ for checkpoint i would have the version of the data for the logical address 202 as of the point-in-time of checkpoint i.

In one embodiment, the checkpoint information 300 may only include mapping information $200_i$ for those logical addresses that have changed since the current checkpoint. In an alternative embodiment, the checkpoint information 300 may comprise a copy of the entire logical-to-physical mapping 200 made as of the checkpoint time. With this alternative embodiment, checkpoint information does not need to be saved during a write operation because the checkpoint information 300 already has all the logical-to-physical mapping as of the checkpoint time.

Figure 3:
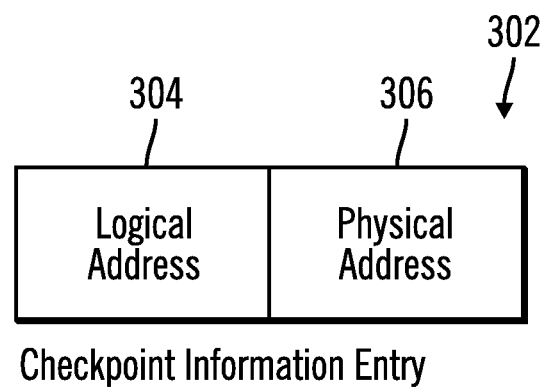
FIG. 3 illustrates an embodiment of information in checkpoint information.

FIG. 3 illustrates an embodiment of an entry 302 in the checkpoint information $300_i$ for a checkpoint i, including a logical address 304 and the physical address 306 having the prior version of the data as of the checkpoint i. There would be an entry 302 for each logical address updated since the checkpoint time.

There may be multiple instances of the checkpoint information $300_i$, one for each of the checkpoints having physical addresses for the logical address 302 as of the checkpoint. As mentioned, because updates to a logical address 302 are written to a new location in the storage media 112, different versions of a logical address are maintained at the physical addresses 306 used for the previous versions.

Figure 4:
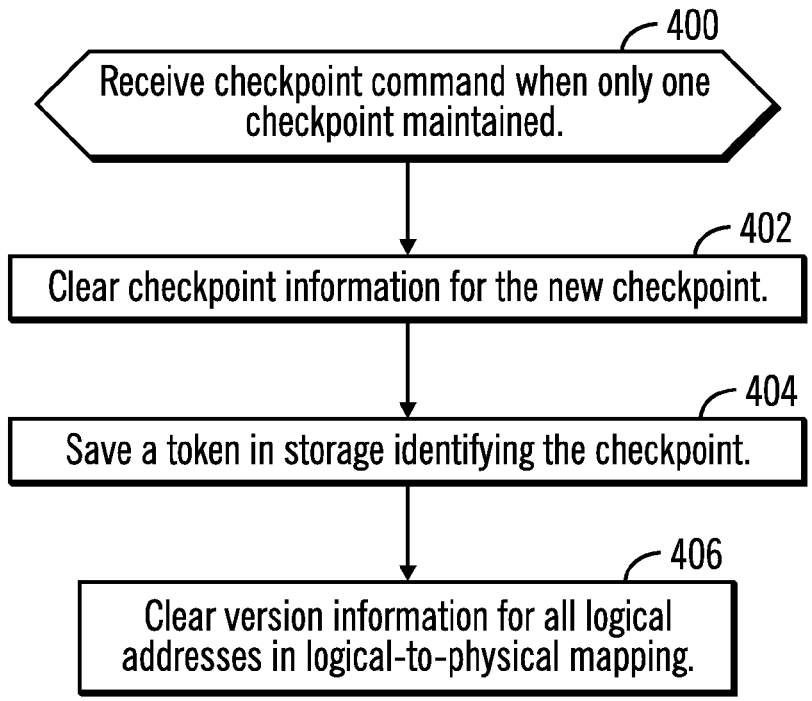
FIG. 4 illustrates an embodiment of operations to process a checkpoint command when only one checkpoint is maintained.

FIG. 4 illustrates an embodiment of operations performed by the control logic 114 to process a checkpoint command received from the host 100 driver 106 in implementations where only one checkpoint is maintained. Upon receiving (at block 400) the checkpoint command, the control logic 114 clears (at block 402) the checkpoint information 300 for the new checkpoint and saves (at block 404) a checkpoint token 120 providing information on the checkpoint. The version information 206 for all the logical addresses in the logical-to-physical mapping 200 is cleared (at block 406) to indicate that there is no previous version of the data as of the checkpoint time.

Figure 5:
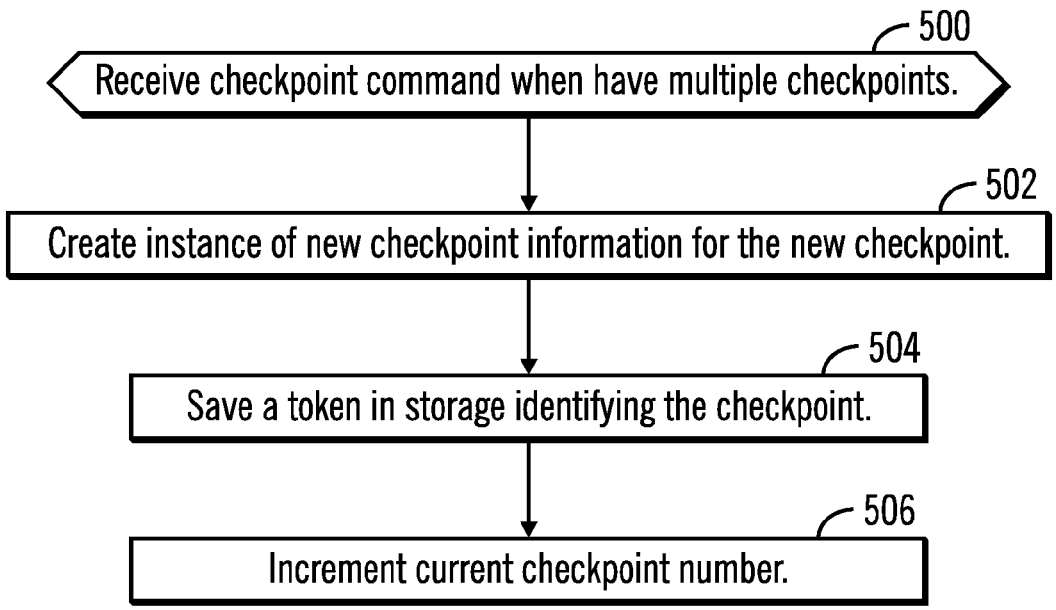
FIG. 5 illustrates an embodiment of operations to process a checkpoint command when multiple checkpoints may be maintained.

FIG. 5 illustrates an embodiment of operations performed by the control logic 114 to process a checkpoint command received from the host 100 driver 106 in implementations where multiple checkpoints may be maintained. Upon receiving (at block 500) the checkpoint command, the control logic 114 creates an instance of new checkpoint information $300_i$. A token 120 is saved (at block 504) identifying the new checkpoint and a current checkpoint number is incremented (at block 506) for the new checkpoint number.

Figure 6:
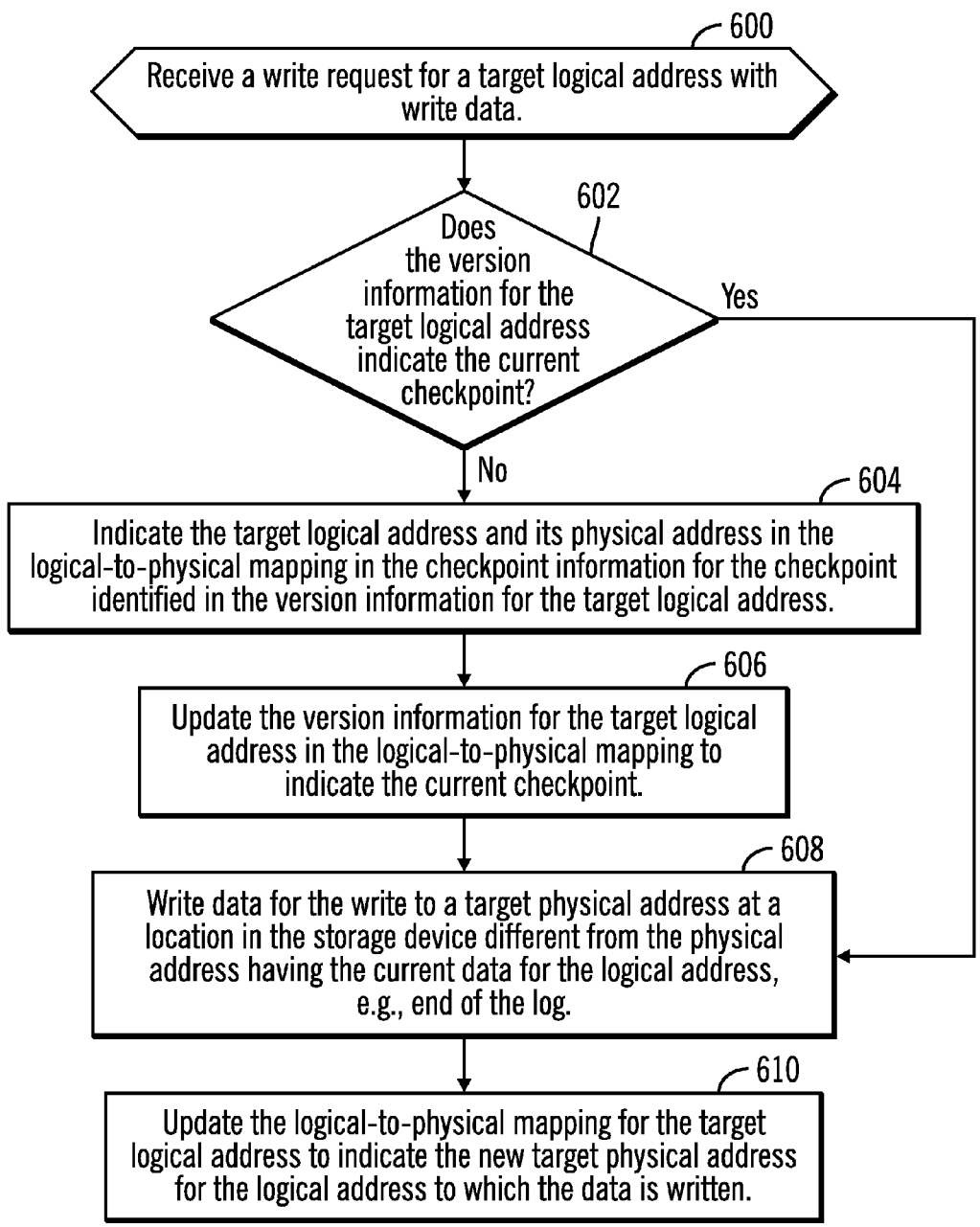
FIG. 6 illustrates an embodiment of operations to process a write request to the storage device.

FIG. 6 illustrates an embodiment of operations performed by the control logic 114 to process a write request to a target logical address with write data after checkpointing is established in implementations where there may be multiple checkpoints. Upon receiving (at block 600) a write request for the target logical address, a determination is made (at block 602) as to whether the version information 206 in the logical-to-physical mapping entry $200_i$ for the target logical address 202 indicates the current checkpoint, or the last created checkpoint. If not, then the control logic 114 indicates (at block 604) the target logical address and its physical address indicated in the logical-to-physical mapping $200_i$ in the checkpoint information 300 for the checkpoint identified in the version information 206 in the mapping entry $200_i$. In this way, the logical to physical mapping as of the last epoch time or checkpoint for the logical address is saved in the checkpoint information for the checkpoint identified in the version information 206. The version information 206 in the logical-to-physical mapping $200_i$ for the target logical address is updated (at block 606) to indicate the current checkpoint version. In implementations where only a single checkpoint is implemented, the version information may just have an indicator or flag indicating whether there is checkpointing.

If (from the yes branch of block 602) the version information 206 indicates the current checkpoint, which indicates that the physical address having the prior version of the data as of the time of the checkpoint has already been stored in the checkpoint information 300, or from block 606, the control logic 114 writes (at block 608) to a target physical address at a location in the storage device different from the physical address having the current data for the logical address being updated. For instance, if a log structured array is used to represent how data is written, then the update may be written to a physical address represented by the most recently used (MRU) end of the log. The logical-to-physical mapping $200_i$ for the target logical address is updated (at block 610) to indicate the new target physical address to which the data is written.

With the operations of FIG. 6, the physical address having the prior version of data for a previous checkpoint, or epoch, for a logical address is indicated in the checkpoint information 300 for that checkpoint to allow restoration of the data as of the different checkpoint times. In this way, writes coming in for a current epoch will be stored to new physical address, and the physical address having the data from the older epoch is stored in the checkpoint information for that epoch/checkpoint.

Figure 7:
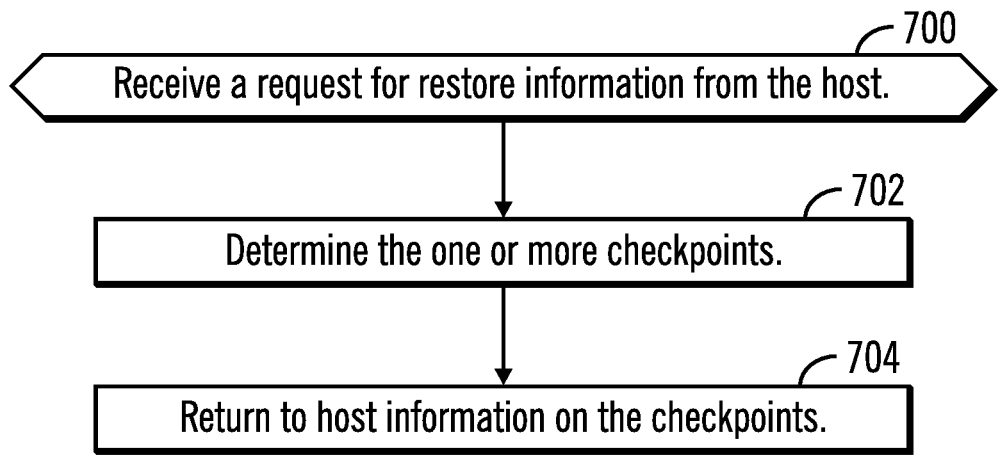
FIG. 7 illustrates an embodiment of operations to process a request for restore information.

FIG. 7 illustrates an embodiment of operations performed by the control logic 114 to process a request for restore information when multiple checkpoints may be maintained. Upon receiving (at block 700) a request for restore information from the host storage device driver 106, the control logic 114 determines (at block 702) one or more checkpoints for which checkpoint information $300_i$ is maintained and returns (at block 704) information on the checkpoints.

Figure 8:
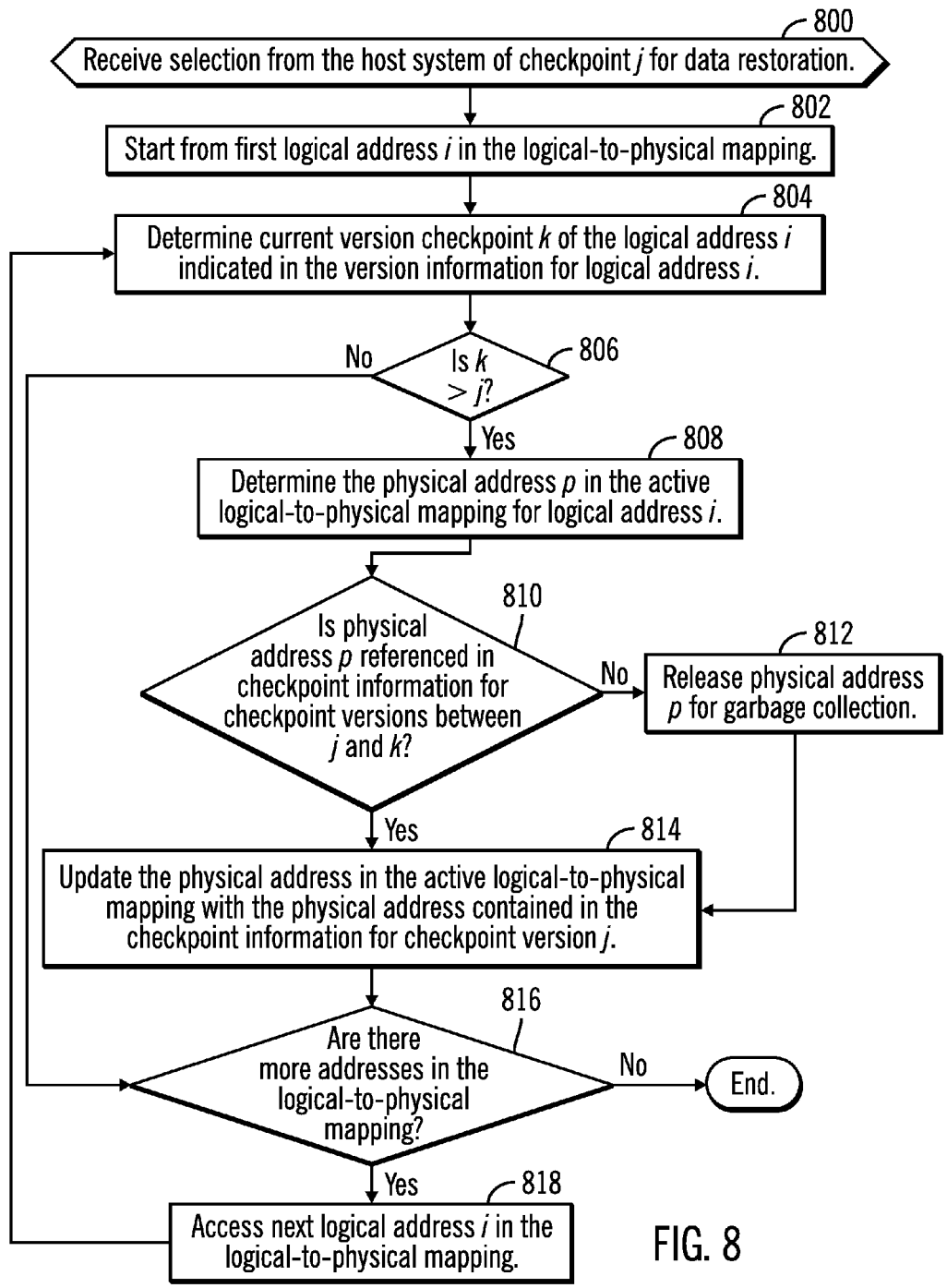
FIG. 8 illustrates an embodiment of operations to process a restore request when multiple checkpoints may be maintained.

FIG. 8 illustrates an embodiment of operations performed by the control logic 114 to process a request to restore data for to a point-in-time as of a selected checkpoint j of a plurality of checkpoints as indicated in the restore information returned to the host storage device driver 106 according to the operations of FIG. 7. Upon receiving (at block 800) selection of one of the checkpoints j from the host 100, the control logic 114 starts from a first logical address i in the active logical-to-physical mapping 200. The control logic 114 determines (at block 804) a current version checkpoint k indicated in the version information 206 for logical address i. If (at block 806) the determined current checkpoint k of the logical address i is greater than the selected checkpoint j to restore, then the current data for the logical address i is at a letter checkpoint or time than the selected checkpoint j to restore.

If (at block 806) the selected checkpoint j to restore is earlier in time than the current checkpoint k in the version information 206 for the logical address i, then the control logic 114 determines (at block 808) the physical address p in the active logical-to-physical mapping $200_i$ for logical address i. The control logic 114 determines (at block 810) if the physical address p is referenced in the in checkpoint information 300 for checkpoint versions between j and k. If the physical address p is not referenced in any checkpoint information 300 between versions j and k, then that physical address p is released (at block 812) for garbage collection. If the physical address p is referenced in other checkpoint information 300 between versions j and k (from the yes branch of block 810) or after releasing the physical address p (from block 812), the physical address 204 in the active logical-to-physical mapping $200_i$ is updated (at block 814) with the physical address 306 in the checkpoint information $300_j$ for the selected checkpoint version j.

After updating the physical address 204 (at block 814) or if the selected version j is the same or greater than the current version k of the logical address I, then if (at block 816) there are more addresses in the logical-to-physical mapping 200 to consider, then the next logical address i in the logical-to-physical mapping 200 is accessed, e.g., i is incremented, and control proceeds back to block 804 to process that next logical address. Otherwise, if there are no more logical addresses in the logical-to-physical mapping 200 to process, control ends.

With the described embodiments, the prior versions of the data remain in the physical addresses of the storage media 112 because new writes or updates are written to new locations, and the checkpoint information 300 maintains the physical address of prior versions of the data for different checkpoints so that the prior versions may be accessed from the physical addresses identified in the checkpoint information 300 for different checkpoints.

The host storage device driver 106 may use received version information of different checkpoints to request to read data as of a checkpoint. In response to the read request, the control logic 114 would determine the current checkpoint in the version information 206 in the entry for the requested logical address in the active logical-to-physical mapping 200. If the requested checkpoint is earlier than the current checkpoint, then the control logic 114 would access the checkpoint information 300 for the requested checkpoint to determine the physical address 306 for the requested logical address 304 as of the requested checkpoint and read and return the data from that physical address indicated in the checkpoint information 300 for the requested checkpoint. If the requested checkpoint is not earlier than the current checkpoint indicated in the version information 300 for the logical address, then the control logic 114 returns the data at the physical address indicated in the active logical-to-physical mapping 200 for the requested logical address.

Figure 9:
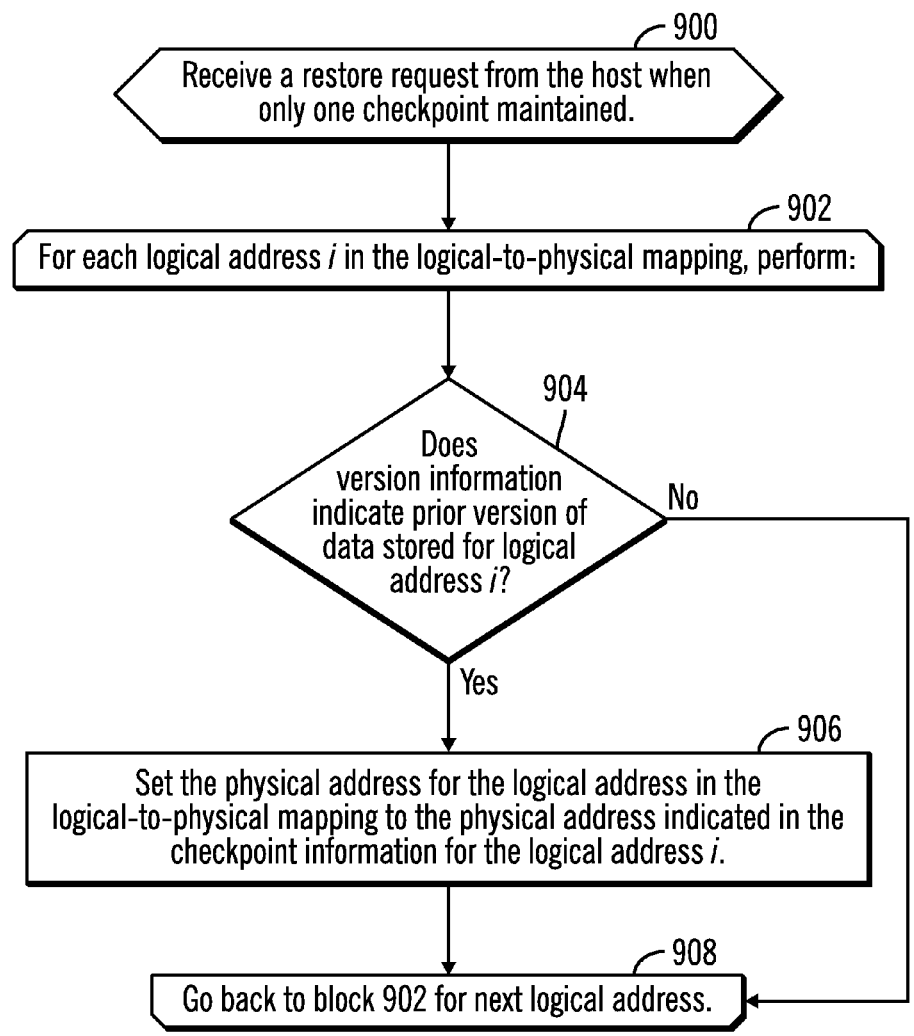
FIG. 9 illustrates an embodiment of operations to process a restore request when only one checkpoint is maintained.

FIG. 9 illustrates an embodiment of operations performed by the control logic 114 to restore the data for the logical addresses in the storage media 112 to a checkpoint when only a single checkpoint is maintained. Upon receiving (at block 900) a restore request from the host storage device driver 106, the control logic 114 performs a loop of operations at blocks 902 through 908 for each of the logical addresses in the storage media 112 to which the restore applies. For logical address i, if (at block 904) the version information 206 for logical address i indicates there is a prior version of data stored for the checkpoint, then the control logic 114 sets (at block 906) the physical address 204 for the logical address i in the logical-to-physical mapping 200 to the physical address 306 indicated in the checkpoint information 300 for the logical address i. Otherwise, if (from the no branch of block 904) the version information 206 indicates there is no prior version of the data or after setting the physical address at block 906, control proceeds to block 908 to consider the next logical address used for the storage media 112 until all logical addresses are considered.

Figure 10:
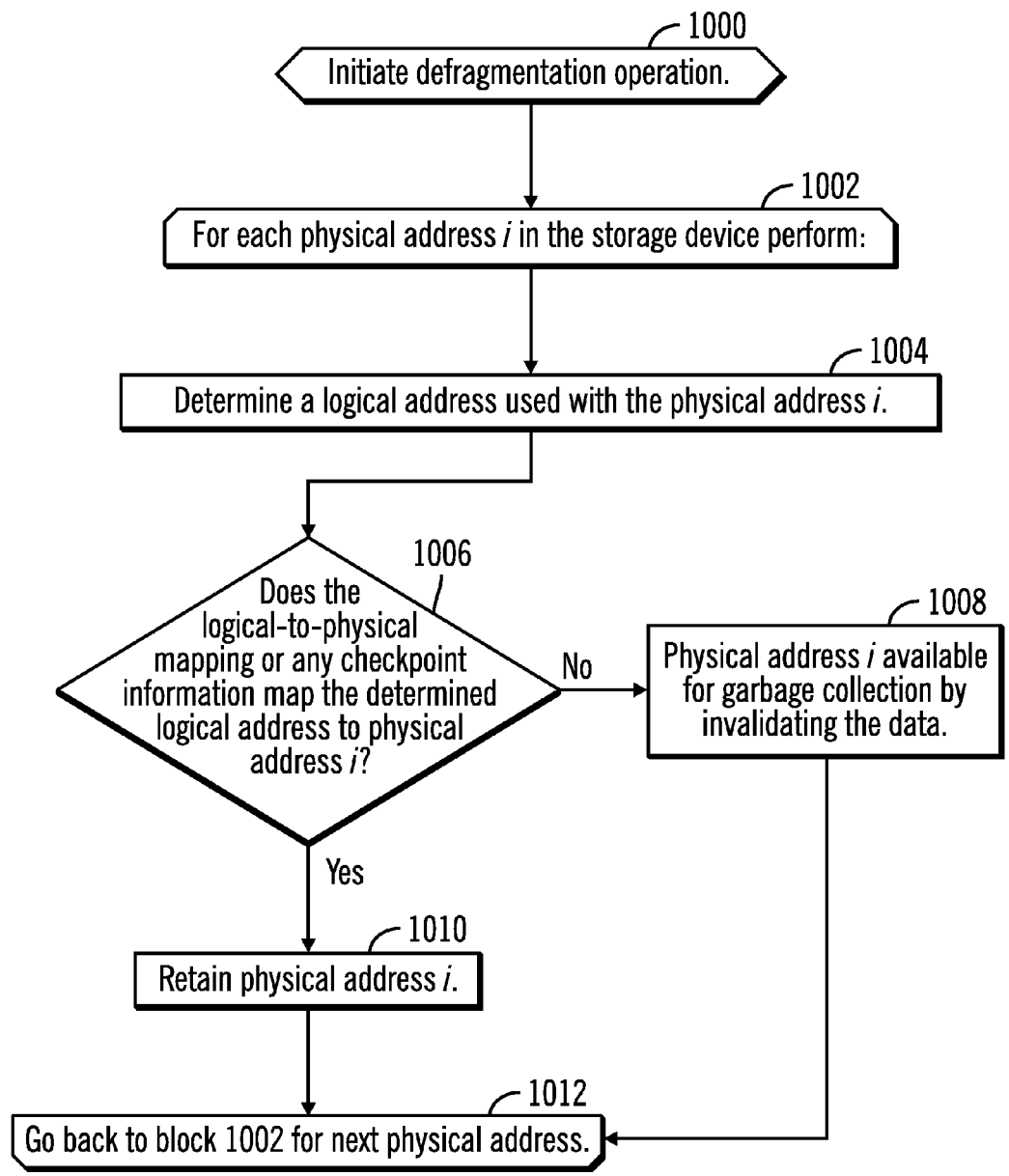
FIG. 10 illustrates an embodiment of operations to process a defragmentation operation.

FIG. 10 illustrates an embodiment of operations performed by the control logic 114 to process a defragmentation command from the host storage device driver 106 or upon automatically performing a defragmentation operation independent of the host 100. Upon initiating (at block 1002) a defragmentation operation, the control logic 114 performs a loop of operations at blocks 1002 through 1012 for each of the physical addresses in the storage media 112 subject to defragmentation, i.e., that hold user data. For physical address i, the control logic 114 determines (at block 1004) a logical address associated with the physical address i, which may be determined from page data having the physical address i, a journal or other metadata for the storage media 112. The control logic 114 determines (at block 1006) whether logical-to-physical mapping 200 or any checkpoint information 300 maps the determined logical address to physical address i. If so, then that physical address addresses a location that has the current data, in the logical-to-physical mapping 200, or a prior version of the data maintained in checkpoint information 300, and should not be subject to garbage collection and being reclaimed. If (at block 1006) physical address i is not identified in the logical-to-physical mapping 200 or any checkpoint information 300, then that physical address i is indicated as available for garbage collection/reclamation. Otherwise, if (at block 1006) the physical address i is identified in the mapping 200 or checkpoint information 300, then that physical address i is retained and not subject to garbage collection/reclamation. From block 1008 or 1010, control proceeds (at block 1012) back to block 1002 to consider any further physical address that may be subject to garbage collection, where garbage collection frees physical addresses to make available for further writes.

The described embodiment of FIG. 10 determines whether a physical address has current data or any prior version of data being saved for checkpoints before subjecting that physical address in the storage media 112 to garbage collection to avoid erasing data that is intended to be maintained.

Figure 11:
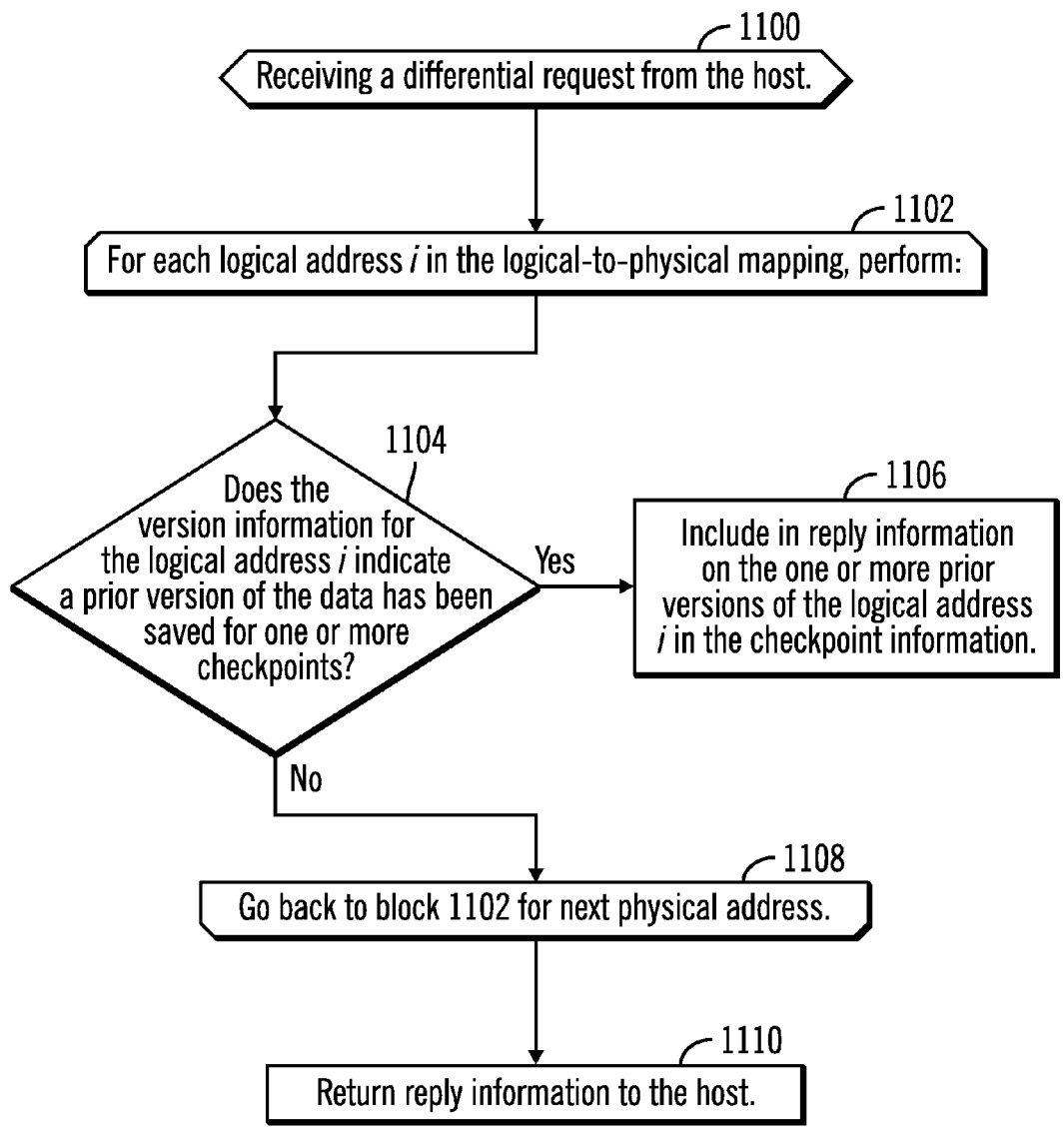
FIG. 11 illustrates an embodiment of operations to process a differential request for information on prior versions of data for logical addresses.

FIG. 11 illustrates an embodiment of operations performed by the control logic 114 to process a differential request from host storage device driver 106 to access information on prior versions of data for one or more checkpoints. Upon receiving (at block 1100) a differential request, the control logic 114 performs a loop of operations at blocks 1102 through 1108 for each logical address i in the logical-to-physical mapping 200. If (at block 1104) the version information 206 for logical address i indicates (at block 1104) there is a prior version of the data that has been saved for one or more checkpoints, then the control logic 114 includes (at block 1106) in a reply information on the one or more prior versions of the data for the logical address i identified in the checkpoint information 300. The information included in the reply may indicate the checkpoints for which prior versions of data is provided for the logical addresses and may optionally include the prior versions of the data. From the no branch of block 1104 or from block 1106, control proceeds (at block 1108) back to block 1102 for a next logical address for the storage media 112. After gathering information in the reply for all logical addresses, the reply information is returned (at block 1110) to the host 100 to process and present to a user.

The differential request may be used as part of the defragmentation operation to obtain information on different versions of data for logical addresses in the storage media 112.

Figure 12:
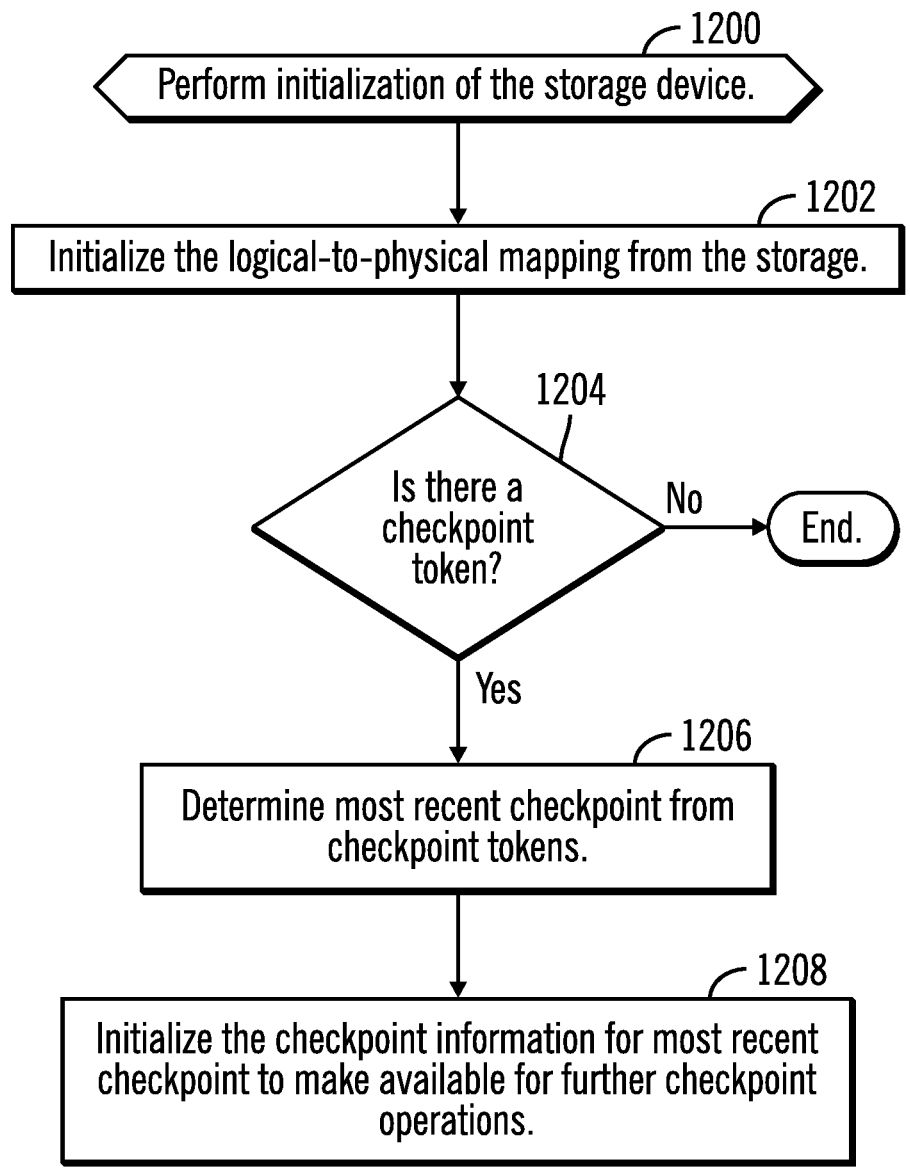
FIG. 12 illustrates an embodiment of operations to perform an initialization of the storage device.

FIG. 12 illustrates an embodiment of operations performed by the control logic 114 to initialize the storage device 102, such as part of a power-on or initialization routine. As part of the initialization (at block 1200), the control logic 114 initializes (at block 1202) the logical-to-physical mapping 200 by loading the logical-to-physical mapping 200a in the storage media 112 into the memory 116. If (at block 1204) there is a checkpoint token 120, then the control logic determines (at block 1206) a most recent checkpoint from the checkpoint token and initializes (at block 1208) the checkpoint information 300 for the most recent checkpoint to make available for further checkpoint operations. If there are multiple instances of checkpoint information 300 for multiple checkpoints, such multiple instances may be loaded into the memory 116 during initialization or later loaded when needed for a restore operation.

If space in the storage media 112 reaches a critical level, then the control logic 114 may perform space management operations such as deleting the checkpoint information for one or more checkpoints so the physical addresses identified in the checkpoint information can be reclaimed or by ceasing saving prior versions of data by no longer indicating physical addresses of prior versions of data for logical addresses in checkpoint information. Alternatively, the storage device may 102 may send a message to the host storage device driver 106 requesting selection of how to proceed, such as deleting checkpoint information, ceasing further checkpoint operations, etc.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the storage device driver 106 and the control logic 114 may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

Figure 13:
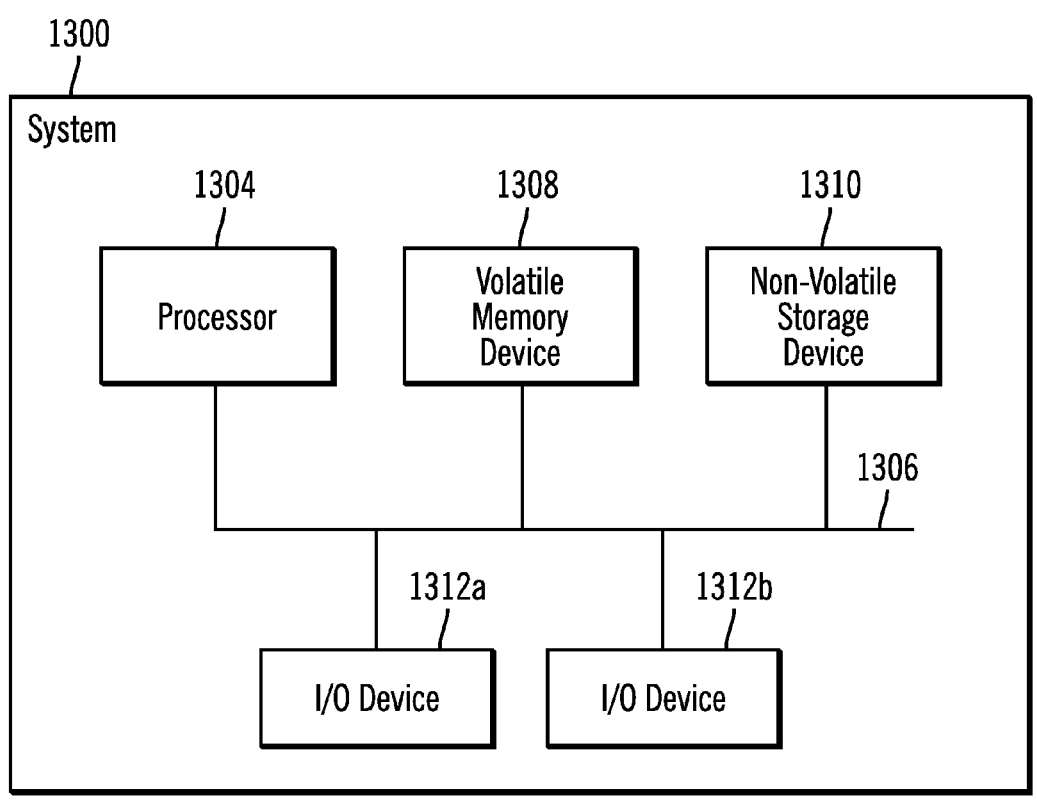
FIG. 13 illustrates a system in which the host system of FIG. 1 may be implemented.

FIG. 13 illustrates an embodiment of a system 1300 in which the components may be implemented. The system 1300 includes a processor 1304, such as in the host system 100, that communicates over a bus 1306 with a volatile memory device 1308 in which programs, operands and parameters, including the operating system 104 and storage device driver 106, being executed are cached, and a non-volatile storage device 1310, in which data and programs may be stored, such as the storage device 102. The processor 1504 may also communicate with Input/Output (I/O) devices 1312a, 1312b, which may comprise input devices, display devices, graphics cards, ports, network interfaces, etc. The non-volatile storage device 1310 may be mounted to the system enclosure 1300, such as in a storage drive bay, or connected to the system 1300 through a port interface or over the network.

Examples

The following examples pertain to further embodiments.

Example 1 is a computer readable storage media having computer program instructions that when executed cause operations to be performed with respect to a storage device, the operations comprising: providing a logical-to-physical mapping indicating for each logical address used to access the storage device a physical address in the storage device having current data for the logical address and version information indicating whether there is a prior version of data for the logical address at a physical address in the storage device different from the physical address provided in the logical-to-physical mapping; receiving a write directed to a target logical address; in response to the logical-to-physical mapping indicating that there is no prior version of the data for the target logical address, performing: including information on the target physical address and the physical address indicated in the logical-to-physical mapping in checkpoint information; updating the version information for the target logical address to indicate that there is a prior version of data; writing data for the write to a target physical address at a location in the storage device different from the physical address having the current data for the target logical address; and updating the logical-to-physical mapping for the target logical address to indicate the target physical address.

In Example 2, the subject matter of Example 1 and 3-12 can optionally include that the operations further comprise: in response to the logical-to-physical mapping indicating that there is a prior version of the data for the target logical address, performing: writing data for the write to a target physical address in the storage device; and updating the logical-to-physical mapping for the target logical address to indicate the target physical address without updating the checkpoint information.

In Example 3, the subject matter of Example 1-2 and 4-12 can optionally include that the computer readable storage media is implemented in the storage device, wherein a host system accesses data in the storage device over a data interface, wherein the operations further comprise: in response processing a checkpoint command from the host system, performing: erasing the checkpoint information; and setting the version information for each of the logical addresses in the logical-to-physical mapping to indicate that there is no prior version of data for the logical address.

In Example 4, the subject matter of Example 1-3 and 5-12 can optionally include that the computer readable storage media is implemented in the storage device, wherein a host system accesses data in the storage device over a data interface, wherein the operations in response to the checkpoint command further comprise: maintaining a security key for a checkpoint established by the checkpoint command, wherein the storage device uses the key to authenticate received commands related to the checkpoint.

In Example 5, the subject matter of Example 1-4 and 6-12 can optionally include the computer readable storage media is implemented in the storage device, wherein a host system accesses data in the storage device over a data interface, wherein the operations further comprise: in response to processing a restore request from the host system, performing for each logical address in the logical-to-physical mapping: in response to the version information for the logical address indicating that there is a prior version of the data, performing: setting the physical address for the logical address in the logical-to-physical mapping to the physical address indicated in the checkpoint information for the logical address; and setting the version information to indicate that there is no prior version of the data.

In Example 6, the subject matter of Example 1-5 and 7-12 can optionally include the computer readable storage media is implemented in the storage device, wherein a host system accesses data in the storage device over a data interface, wherein the computer readable storage media is implemented in the storage device, wherein a host system accesses data in the storage device over a data interface, wherein the operations further comprise: in response to processing a differential request from the host system, returning information on each logical address whose version information indicates that the data for the logical address has changed since a last checkpoint.

In Example 7, the subject matter of Example 1-6 and 8-12 can optionally include saving a token indicating a checkpoint to the storage device; saving the logical-to-physical mapping and the checkpoint information to the storage device; during an initialization of the storage device, processing the token to determine that there is the checkpoint; and in response to processing the token, initializing the logical-to-physical mapping and the checkpoint information for use following the initialization.

In Example 8, the subject matter of Example 1-7 and 9-12 can optionally include that in response to initiating a defragmentation operation, for physical addresses in the logical-to-physical mapping that are candidates for defragmentation, reclaiming the selected physical addresses that are not contained in a mapping in the logical-to-physical mapping and the checkpoint information.

In Example 9, the subject matter of Example 1-8 and 10-12 can optionally include that the write is received during a current checkpoint of a plurality of checkpoints, wherein the operations further comprise: in response to the version information for the target logical address not indicating the current checkpoint, including information on the target logical address and the physical address indicated in the logical-to-physical mapping in the checkpoint information for the checkpoint indicated in the version information for the target logical address, wherein the updating the version information comprises indicating the current checkpoint in the version information for the target logical address.

In Example 10, the subject matter of Example 1-9 and 11-12 can optionally include that the computer readable storage media is implemented in the storage device, wherein a host system accesses data in the storage device, wherein the operations further comprise: receiving a restore command to restore data as of a selected checkpoint comprising one of a plurality checkpoints for which checkpoint information is maintained; performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i.

In Example 11, the subject matter of Example 1-10 and 12 can optionally include that the operations further comprise: receiving a request to read data during a current checkpoint for a target logical address at a requested checkpoint earlier than the current checkpoint; returning data from the physical address provided for the target logical address in the checkpoint information for the requested checkpoint when the checkpoint information for the requested checkpoint provides a physical address for the target logical address; and returning data from the physical address mapping to the target logical address in the logical-to-physical mapping when the checkpoint information for the requested checkpoint does not provide a physical address for the target logical address.

In Example 12, the subject matter of Example 1-11 can optionally include that the computer readable storage medium comprises a controller to manage access to the storage device.

Example 13 is a storage device, comprising: a controller having control logic that when executed cause operations to be performed with respect to the storage device, the operations comprising: providing a logical-to-physical mapping indicating for each logical address used to access the storage device a physical address in the storage device having current data for the logical address and version information indicating whether there is a prior version of data for the logical address at a physical address in the storage device different from the physical address provided in the logical-to-physical mapping; receiving a write directed to a target logical address; in response to the logical-to-physical mapping indicating that there is no prior version of the data for the target logical address, performing: including information on the target physical address and the physical address indicated in the logical-to-physical mapping in checkpoint information; updating the version information for the target logical address to indicate that there is a prior version of data; writing data for the write to a target physical address at a location in the storage device different from the physical address having the current data for the target logical address; and updating the logical-to-physical mapping for the target logical address to indicate the target physical address.

In Example 14, the subject matter of Examples 13 and 15-18 can optionally include that the operations further comprise: in response to the logical-to-physical mapping indicating that there is a prior version of the data for the target logical address, performing: writing data for the write to a target physical address in the storage device; and updating the logical-to-physical mapping for the target logical address to indicate the target physical address without updating the checkpoint information.

In Example 15, the subject matter of Examples 13-14 and 16-18 can optionally include that a host system accesses data in the storage device over a data interface, wherein the operations further comprise: in response processing a checkpoint command from the host system, performing: erasing the checkpoint information; and setting the version information for each of the logical addresses in the logical-to-physical mapping to indicate that there is no prior version of data for the logical address.

In Example 16, the subject matter of Examples 13-15, 17, 18 can optionally include that a host system accesses data in the storage device over a data interface, wherein the operations further comprise: in response to processing a restore request from the host system, performing for each logical address in the logical-to-physical mapping: in response to the version information for the logical address indicating that there is a prior version of the data, performing: setting the physical address for the logical address in the logical-to-physical mapping to the physical address indicated in the checkpoint information for the logical address; and setting the version information to indicate that there is no prior version of the data.

In Example 17, the subject matter of Examples 13-16 and 18 can optionally include that the write is received during a current checkpoint of a plurality of checkpoints, wherein the operations further comprise: in response to the version information for the target logical address not indicating the current checkpoint, including information on the target logical address and the physical address indicated in the logical-to-physical mapping in the checkpoint information for the checkpoint indicated in the version information for the target logical address, wherein the updating the version information comprises indicating the current checkpoint in the version information for the target logical address.

In Example 18, the subject matter of Examples 13-17 can optionally include that a host system accesses data in the storage device, wherein the operations further comprise: receiving a restore command to restore data as of a selected checkpoint comprising one of a plurality checkpoints for which checkpoint information is maintained; performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i.

Example 19 is a method for managing access to a storage device, comprising: providing a logical-to-physical mapping indicating for each logical address used to access the storage device a physical address in the storage device having current data for the logical address and version information indicating whether there is a prior version of data for the logical address at a physical address in the storage device different from the physical address provided in the logical-to-physical mapping; receiving a write directed to a target logical address; in response to the logical-to-physical mapping indicating that there is no prior version of the data for the target logical address, performing: including information on the target physical address and the physical address indicated in the logical-to-physical mapping in checkpoint information; updating the version information for the target logical address to indicate that there is a prior version of data; writing data for the write to a target physical address at a location in the storage device different from the physical address having the current data for the target logical address; and updating the logical-to-physical mapping for the target logical address to indicate the target physical address.

In Example 20, the subject matter of Examples 19 and 21-24 can optionally include that in response to the logical-to-physical mapping indicating that there is a prior version of the data for the target logical address, performing: writing data for the write to a target physical address in the storage device; and updating the logical-to-physical mapping for the target logical address to indicate the target physical address without updating the checkpoint information.

In Example 21, the subject matter of Examples 19, 20 and 22-24 can optionally include that in response processing a checkpoint command from a host system, performing: erasing the checkpoint information; and setting the version information for each of the logical addresses in the logical-to-physical mapping to indicate that there is no prior version of data for the logical address.

In Example 22, the subject matter of Examples 19-21 and 23-24 can optionally include that in response to processing a restore request from the host system, performing for each logical address in the logical-to-physical mapping: in response to the version information for the logical address indicating that there is a prior version of the data, performing: setting the physical address for the logical address in the logical-to-physical mapping to the physical address indicated in the checkpoint information for the logical address; and setting the version information to indicate that there is no prior version of the data.

In Example 23, the subject matter of Examples 19-22 and 24 can optionally include that the write is received during a current checkpoint of a plurality of checkpoints, further comprising: in response to the version information for the target logical address not indicating the current checkpoint, including information on the target logical address and the physical address indicated in the logical-to-physical mapping in the checkpoint information for the checkpoint indicated in the version information for the target logical address, wherein the updating the version information comprises indicating the current checkpoint in the version information for the target logical address.

In Example 24, the subject matter of Examples 19-23 can optionally include receiving a restore command to restore data as of a selected checkpoint comprising one of a plurality checkpoints for which checkpoint information is maintained; performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i.

In Example 25, the subject matter of Example can optionally include at least one additional step of:

(1) in response to the logical-to-physical mapping indicating that there is a prior version of the data for the target logical address, performing: writing data for the write to a target physical address in the storage device; and updating the logical-to-physical mapping for the target logical address to indicate the target physical address without updating the checkpoint information; and/or (2) wherein the computer readable storage media is implemented in the storage device, wherein a host system accesses data in the storage device over a data interface, wherein the operations further comprise: in response processing a checkpoint command from the host system, performing: erasing the checkpoint information; and setting the version information for each of the logical addresses in the logical-to-physical mapping to indicate that there is no prior version of data for the logical address; and/or (3) wherein the computer readable storage media is implemented in the storage device, wherein a host system accesses data in the storage device over a data interface, wherein the operations in response to the checkpoint command further comprise: maintaining a security key for a checkpoint established by the checkpoint command, wherein the storage device uses the key to authenticate received commands related to the checkpoint; and/or (4) wherein the computer readable storage media is implemented in the storage device, wherein a host system accesses data in the storage device over a data interface, wherein the operations further comprise: in response to processing a restore request from the host system, performing for each logical address in the logical-to-physical mapping: in response to the version information for the logical address indicating that there is a prior version of the data, performing: setting the physical address for the logical address in the logical-to-physical mapping to the physical address indicated in the checkpoint information for the logical address; and setting the version information to indicate that there is no prior version of the data; and/or (5) wherein the computer readable storage media is implemented in the storage device, wherein a host system accesses data in the storage device over a data interface, wherein the computer readable storage media is implemented in the storage device, wherein a host system accesses data in the storage device over a data interface, wherein the operations further comprise: in response to processing a differential request from the host system, returning information on each logical address whose version information indicates that the data for the logical address has changed since a last checkpoint; and/or (6) wherein the operations further comprise: saving a token indicating a checkpoint to the storage device; saving the logical-to-physical mapping and the checkpoint information to the storage device; during an initialization of the storage device, processing the token to determine that there is the checkpoint; and in response to processing the token, initializing the logical-to-physical mapping and the checkpoint information for use following the initialization; and/or (7) in response to initiating a defragmentation operation, for physical addresses in the logical-to-physical mapping that are candidates for defragmentation, reclaiming the selected physical addresses that are not contained in a mapping in the logical-to-physical mapping and the checkpoint information; and/or (8) wherein the write is received during a current checkpoint of a plurality of checkpoints, wherein the operations further comprise: in response to the version information for the target logical address not indicating the current checkpoint, including information on the target logical address and the physical address indicated in the logical-to-physical mapping in the checkpoint information for the checkpoint indicated in the version information for the target logical address, wherein the updating the version information comprises indicating the current checkpoint in the version information for the target logical address; and/or (9) wherein the computer readable storage media is implemented in the storage device, wherein a host system accesses data in the storage device, wherein the operations further comprise: receiving a restore command to restore data as of a selected checkpoint comprising one of a plurality checkpoints for which checkpoint information is maintained; performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i; and/or

(10) wherein the operations further comprise: receiving a request to read data during a current checkpoint for a target logical address at a requested checkpoint earlier than the current checkpoint; returning data from the physical address provided for the target logical address in the checkpoint information for the requested checkpoint when the checkpoint information for the requested checkpoint provides a physical address for the target logical address; and returning data from the physical address mapping to the target logical address in the logical-to-physical mapping when the checkpoint information for the requested checkpoint does not provide a physical address for the target logical address; and/or

(11) wherein the computer readable storage medium comprises a controller to manage access to the storage device.

Example 26 is a machine readable medium including code, when executed, to cause a machine to perform the method of any one of claims 19-24.

Example 27 is a system, comprising: a host; and a storage device in communication with the host, comprising: a computer readable storage media having computer program instructions that when executed cause operations to be performed with respect to the storage device, the operations comprising: providing a logical-to-physical mapping indicating for each logical address used to access the storage device a physical address in the storage device having current data for the logical address and version information indicating whether there is a prior version of data for the logical address at a physical address in the storage device different from the physical address provided in the logical-to-physical mapping; receiving a write from the host directed to a target logical address; in response to the logical-to-physical mapping indicating that there is no prior version of the data for the target logical address, performing: including information on the target physical address and the physical address indicated in the logical-to-physical mapping in checkpoint information; updating the version information for the target logical address to indicate that there is a prior version of data; writing data for the write to a target physical address at a location in the storage device different from the physical address having the current data for the target logical address; and updating the logical-to-physical mapping for the target logical address to indicate the target physical address.

In Example 28, the subject matter of Example 27 can optionally include that the operations further comprise: receiving a restore command to restore data as of a selected checkpoint comprising one of a plurality checkpoints for which checkpoint information is maintained; performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i.

Example 29 is an apparatus, comprising: means for providing a logical-to-physical mapping indicating for each logical address used to access a storage device a physical address in the storage device having current data for the logical address and version information indicating whether there is a prior version of data for the logical address at a physical address in the storage device different from the physical address provided in the logical-to-physical mapping; means for receiving a write from the host directed to a target logical address; means for including information on the target physical address and the physical address indicated in the logical-to-physical mapping in checkpoint information in response to the logical-to-physical mapping indicating that there is no prior version of the data for the target logical address; means for updating the version information for the target logical address to indicate that there is a prior version of data in response to the logical-to-physical mapping indicating that there is no prior version of the data for the target logical address; means for writing data for the write to a target physical address at a location in the storage device different from the physical address having the current data for the target logical address; and means for updating the logical-to-physical mapping for the target logical address to indicate the target physical address.

In Example 30, the subject matter of Example 29 can optionally include means for receiving a restore command to restore data as of a selected checkpoint comprising one of a plurality checkpoints for which checkpoint information is maintained; means for performing for each logical address i in the logical-to-physical mapping: in response to a current version checkpoint in the version information for the logical address i being greater than the selected checkpoint, performing: releasing the physical address indicated in the logical-to-physical mapping for the logical address i if the physical address is not referenced in checkpoint information for checkpoints between the selected checkpoint and the current version checkpoint; and updating the physical address in the logical-to-physical mapping for the logical address i to the physical address indicated in the checkpoint information for the selected checkpoint for the logical address i.

What is claimed:

1. A non-transitory computer readable storage medium having computer program instructions that when executed cause operations with respect to a storage device that:
provide a logical-to-physical mapping that indicates, for each logical address used to access the storage device, a physical address in the storage device having current data for the logical address and version information that indicates whether there is a prior version of data for the logical address at a physical address in the storage device different from the physical address provided in the logical-to-physical mapping;
receive a write directed to a target logical address;
in response to the logical-to-physical mapping indicating that there is no prior version of data for the target logical address:
include information on a target physical address and the physical address indicated in the logical-to-physical mapping in checkpoint information;
update the version information for the target logical address to indicate that there is a prior version of data;
write data for the write to a target physical address at a location in the storage device different from the physical address having the current data for the target logical address; and
update the logical-to-physical mapping for the target logical address to indicate the target physical address.

2. The computer readable storage medium of claim 1, wherein the operations further:
in response to the logical-to-physical mapping indicating that there is a prior version of the data for the target logical address:
write data for the write to a target physical address in the storage device; and
update the logical-to-physical mapping for the target logical address to indicate the target physical address without updating the checkpoint information.

3. The computer readable storage medium of claim 1, wherein the computer readable storage media is implemented in the storage device, wherein a host system accesses data in the storage device over a data interface, wherein the operations further:
in response to processing a checkpoint command from the host system:
erase the checkpoint information; and
set the version information for each logical address of logical addresses in the logical-to-physical mapping to indicate that there is no prior version of data for the logical address.

4. The computer readable storage medium of claim 3, wherein the computer readable storage media is implemented in the storage device, wherein a host system accesses data in the storage device over a data interface, wherein in response to the checkpoint command, maintain a security key for a checkpoint established by the checkpoint command, wherein the storage device uses the security key to authenticate received commands related to the checkpoint.

5. The computer readable storage medium of claim 1, wherein the computer readable storage media is implemented in the storage device, wherein a host system accesses data in the storage device over a data interface, wherein the operations further:
in response to processing a restore request from the host system, for each logical address in the logical-to-physical mapping:
in response to the version information for the logical address indicating that there is a prior version of the data:
set the physical address for the logical address in the logical-to-physical mapping to the physical address indicated in the checkpoint information for the logical address; and
set the version information to indicate that there is no prior version of the data.

6. The computer readable storage medium of claim 1, wherein the computer readable storage media is implemented in the storage device, wherein a host system accesses data in the storage device over a data interface, wherein the computer readable storage media is implemented in the storage device, wherein a host system accesses data in the storage device over a data interface, wherein the operations further:
in response to processing a differential request from the host system, return information on each logical address whose version information indicates that the data for the logical address has changed since a last checkpoint.

7. The computer readable storage medium of claim 1, wherein the operations further:

save a token that indicates a checkpoint to the storage device;
save the logical-to-physical mapping and the checkpoint information to the storage device;
during an initialization of the storage device, process the token to determine that there is the checkpoint; and
in response to processing the token, initialize the logical-to-physical mapping and the checkpoint information for use following the initialization.

8. The computer readable storage medium of claim 1, wherein the operations further:
in response to initiating a defragmentation operation, for physical addresses in the logical-to-physical mapping that are candidates for defragmentation, reclaim selected physical addresses that are not contained in a mapping in the logical-to-physical mapping and the checkpoint information.

9. The computer readable storage medium of claim 1, wherein the write is received during a current checkpoint of a plurality of checkpoints, wherein the operations further:
in response to the version information for the target logical address not indicating the current checkpoint, include information on the target logical address and the physical address indicated in the logical-to-physical mapping in the checkpoint information for the checkpoint indicated in the version information for the target logical address, wherein to update the version information includes indicating the current checkpoint in the version information for the target logical address.

10. The computer readable storage medium of claim 1, wherein the computer readable storage media is implemented in the storage device, wherein a host system accesses data in the storage device, wherein the operations further:
receive a restore command to restore data as of a selected checkpoint comprising one of a plurality checkpoints for which checkpoint information is maintained;
for each logical address i in the logical-to-physical mapping:
in response to a current version checkpoint in the version information for the logical address i being greater than the selected checkpoint:
release the physical address indicated in the logical-to-physical mapping for the logical address i if the physical address is not referenced in checkpoint information for checkpoints between the selected checkpoint and the current version checkpoint; and
update the physical address in the logical-to-physical mapping for the logical address i to the physical address indicated in the checkpoint information for the selected checkpoint for the logical address i.

11. The computer readable storage medium of claim 1, wherein the operations further:
receive a request to read data during a current checkpoint for a target logical address at a requested checkpoint earlier than the current checkpoint;
return data from the physical address provided for the target logical address in the checkpoint information for the requested checkpoint when the checkpoint information for the requested checkpoint provides a physical address for the target logical address; and
return data from the physical address mapping to the target logical address in the logical-to-physical mapping when the checkpoint information for the requested checkpoint does not provide a physical address for the target logical address.

12. A storage device, comprising:
a controller having control logic that when executed cause operations with respect to the storage device that:
provide a logical-to-physical mapping that indicates, for each logical address used to access the storage device, a physical address in the storage device having current data for the logical address and version information that indicates whether there is a prior version of data for the logical address at a physical address in the storage device different from the physical address provided in the logical-to-physical mapping;
receive a write directed to a target logical address;
in response to the logical-to-physical mapping indicating that there is no prior version of data for the target logical address:
include information on a target physical address and the physical address indicated in the logical-to-physical mapping in checkpoint information;
update the version information for the target logical address to indicate that there is a prior version of data;
write data for the write to a target physical address at a location in the storage device different from the physical address having the current data for the target logical address; and
update the logical-to-physical mapping for the target logical address to indicate the target physical address.

13. The storage device of claim 12, wherein the operations further:
in response to the logical-to-physical mapping indicating that there is a prior version of the data for the target logical address:
write data for the write to a target physical address in the storage device; and
update the logical-to-physical mapping for the target logical address to indicate the target physical address without updating the checkpoint information.

14. The storage device of claim 12, wherein a host system accesses data in the storage device over a data interface, wherein the operations further:
in response to processing a checkpoint command from the host system:
erase the checkpoint information; and
set the version information for each logical address of logical addresses in the logical-to-physical mapping to indicate that there is no prior version of data for the logical address.

15. The storage device of claim 12, wherein a host system accesses data in the storage device over a data interface, wherein the operations further:
in response to processing a restore request from the host system, for each logical address in the logical-to-physical mapping:
in response to the version information for the logical address indicating that there is a prior version of the data:
set the physical address for the logical address in the logical-to-physical mapping to the physical address indicated in the checkpoint information for the logical address; and
set the version information to indicate that there is no prior version of the data.

16. The storage device of claim 12, wherein the write is received during a current checkpoint of a plurality of checkpoints, wherein the operations further:

in response to the version information for the target logical address not indicating the current checkpoint, include information on the target logical address and the physical address indicated in the logical-to-physical mapping in the checkpoint information for the checkpoint indicated in the version information for the target logical address, wherein to update the version information includes indicating the current checkpoint in the version information for the target logical address.

17. The storage device of claim 12, wherein a host system accesses data in the storage device, wherein the operations further:
receive a restore command to restore data as of a selected checkpoint comprising one of a plurality checkpoints for which checkpoint information is maintained;
for each logical address i in the logical-to-physical mapping:
in response to a current version checkpoint in the version information for the logical address i being greater than the selected checkpoint:
release the physical address indicated in the logical-to-physical mapping for the logical address i if the physical address is not referenced in checkpoint information for checkpoints between the selected checkpoint and the current version checkpoint; and
update the physical address in the logical-to-physical mapping for the logical address i to the physical address indicated in the checkpoint information for the selected checkpoint for the logical address i.

18. A method for managing access to a storage device, comprising:
providing a logical-to-physical mapping indicating, for each logical address used to access the storage device, a physical address in the storage device having current data for the logical address and version information indicating whether there is a prior version of data for the logical address at a physical address in the storage device different from the physical address provided in the logical-to-physical mapping;
receiving a write directed to a target logical address;
in response to the logical-to-physical mapping indicating that there is no prior version of data for the target logical address, performing:
including information on a target physical address and the physical address indicated in the logical-to-physical mapping in checkpoint information;
updating the version information for the target logical address to indicate that there is a prior version of data;
writing data for the write to a target physical address at a location in the storage device different from the physical address having the current data for the target logical address; and
updating the logical-to-physical mapping for the target logical address to indicate the target physical address.

19. The method of claim 18, further comprising:
in response to the logical-to-physical mapping indicating that there is a prior version of the data for the target logical address, performing:
writing data for the write to a target physical address in the storage device; and
updating the logical-to-physical mapping for the target logical address to indicate the target physical address without updating the checkpoint information.

20. The method of claim 18, further comprising:
in response to processing a checkpoint command from a host system, performing:
erasing the checkpoint information; and
setting the version information for each logical address of logical addresses in the logical-to-physical mapping to indicate that there is no prior version of data for the logical address.

21. The method of claim 18, further comprising:
in response to processing a restore request from a host system, performing for each logical address in the logical-to-physical mapping:
in response to the version information for the logical address indicating that there is a prior version of the data, performing:
setting the physical address for the logical address in the logical-to-physical mapping to the physical address indicated in the checkpoint information for the logical address; and
setting the version information to indicate that there is no prior version of the data.

22. The method of claim 18, wherein the write is received during a current checkpoint of a plurality of checkpoints, further comprising:
in response to the version information for the target logical address not indicating the current checkpoint, including information on the target logical address and the physical address indicated in the logical-to-physical mapping in the checkpoint information for the checkpoint indicated in the version information for the target logical address, wherein the updating the version information comprises indicating the current checkpoint in the version information for the target logical address.

23. The method of claim 18, further comprising:
receiving a restore command to restore data as of a selected checkpoint comprising one of a plurality checkpoints for which checkpoint information is maintained;
performing for each logical address i in the logical-to-physical mapping:
in response to a current version checkpoint in the version information for the logical address i being greater than the selected checkpoint, performing:
releasing the physical address indicated in the logical-to-physical mapping for the logical address i if the physical address is not referenced in checkpoint information for checkpoints between the selected checkpoint and the current version checkpoint; and
updating the physical address in the logical-to-physical mapping for the logical address i to the physical address indicated in the checkpoint information for the selected checkpoint for the logical address i.

24. A system, comprising:
a host; and
a storage device in communication with the host, comprising:
a computer readable storage media having computer program instructions that when executed cause operations to be performed with respect to the storage device to:
provide a logical-to-physical mapping that indicates, for each logical address used to access the storage device, a physical address in the storage device having current data for the logical address and version information that indicates whether there is a prior version of data for the logical address at a physical address in the storage device different from the physical address provided in the logical-to-physical mapping;

receive a write from the host directed to a target logical address;

in response to the logical-to-physical mapping indicating that there is no prior version of data for the target logical address:
include information on a target physical address and the physical address indicated in the logical-to-physical mapping in checkpoint information;
update the version information for the target logical address to indicate that there is a prior version of data;
write data for the write to a target physical address at a location in the storage device different from the physical address having the current data for the target logical address; and
update the logical-to-physical mapping for the target logical address to indicate the target physical address.

25. The system of claim 24, wherein the operations further:
receive a restore command to restore data as of a selected checkpoint comprising one of a plurality checkpoints for which checkpoint information is maintained;
for each logical address i in the logical-to-physical mapping:
in response to a current version checkpoint in the version information for the logical address i being greater than the selected checkpoint:
release the physical address indicated in the logical-to-physical mapping for the logical address i if the physical address is not referenced in checkpoint information for checkpoints between the selected checkpoint and the current version checkpoint; and
update the physical address in the logical-to-physical mapping for the logical address i to the physical address indicated in the checkpoint information for the selected checkpoint for the logical address i.

* * * * *